US011431745B2

(12) United States Patent
Wicker et al.

(10) Patent No.: US 11,431,745 B2
(45) Date of Patent: Aug. 30, 2022

(54) TECHNIQUES FOR CURATING THREAT INTELLIGENCE DATA

(71) Applicant: Microsoft Technology Licensing, LLC, Redmond, WA (US)

(72) Inventors: Andrew W. Wicker, Snoqualmie, WA (US); Peter A. Cap, Duvall, WA (US); Christian Seifert, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 15/966,914

(22) Filed: Apr. 30, 2018

(65) Prior Publication Data

US 2019/0334942 A1    Oct. 31, 2019

(51) Int. Cl.
*H04L 9/40*      (2022.01)
*G06F 21/57*      (2013.01)
*G06F 16/23*      (2019.01)
*G06F 16/28*      (2019.01)

(52) U.S. Cl.
CPC .......... *H04L 63/1433* (2013.01); *G06F 16/23* (2019.01); *G06F 16/288* (2019.01); *G06F 21/577* (2013.01)

(58) Field of Classification Search
CPC ... H04L 63/102; H04L 63/0428; H04L 63/06; H04L 63/1433; G06F 21/6218; G06F 21/602; G06F 2221/2141; G06F 21/6209; G06F 16/23; G06F 16/288; G06F 21/577; G06F 21/55
See application file for complete search history.

(56) References Cited

U.S. PATENT DOCUMENTS

| 8,627,463 | B1 * | 1/2014 | Glick | H04L 63/12 726/22 |
| 9,319,420 | B1 | 4/2016 | Franke et al. | |
| 9,654,485 | B1 * | 5/2017 | Neumann | H04L 63/1441 |
| 10,873,596 | B1 * | 12/2020 | Bourget | G06N 5/047 |
| 2007/0079379 | A1 * | 4/2007 | Sprosts | G06Q 10/107 726/24 |
| 2008/0133540 | A1 * | 6/2008 | Hubbard | H04L 63/101 |

(Continued)

OTHER PUBLICATIONS

Chau, et al, "Polonium: Tera-Scale Graph Mining and Inference for Malware Detection", In Proceedings of the SIAM International Conference on Data Mining, Apr. 28, 2011, pp. 131-142.

(Continued)

*Primary Examiner* — Carl G Colin
*Assistant Examiner* — Hany S. Gadalla
(74) *Attorney, Agent, or Firm* — ArentFox Schiff

(57) ABSTRACT

Described are examples for curating threat intelligence data including receiving threat intelligence data comprising a list of entities, one or more associations between entities, a reputation score for each entity, and/or a confidence value corresponding to the one or more associations. An updated reputation score for at least one of a first type of entities can be determined based at least in part on the confidence value and/or on determining a reputation score of at least one of a second type of entities to which the at least one of the first type of entities is associated in the one or more associations. The reputation score of the at least one of the first type of entities can be updated, in the threat intelligence data, to the updated reputation score.

21 Claims, 5 Drawing Sheets

(56) References Cited

U.S. PATENT DOCUMENTS

| | | | |
|---|---|---|---|
| 2009/0037469 A1* | 2/2009 | Kirsch | G06Q 10/107 |
| 2010/0115040 A1* | 5/2010 | Sargent | H04L 51/12 |
| | | | 709/206 |
| 2012/0060207 A1* | 3/2012 | Mardikar | H04L 63/105 |
| | | | 726/4 |
| 2014/0059683 A1 | 2/2014 | Ashley | |
| 2014/0196110 A1* | 7/2014 | Rubinstein | G06F 21/57 |
| | | | 726/3 |
| 2016/0028759 A1* | 1/2016 | Visbal | H04L 63/1416 |
| | | | 726/22 |
| 2016/0212165 A1* | 7/2016 | Singla | H04L 63/1433 |
| 2016/0359888 A1 | 12/2016 | Gupta et al. | |
| 2017/0142147 A1* | 5/2017 | Singla | G06F 21/554 |
| 2018/0007071 A1* | 1/2018 | Sander | H04L 63/101 |
| 2018/0314834 A1* | 11/2018 | Sander | G06F 21/554 |
| 2018/0374151 A1* | 12/2018 | Joshi | G06Q 40/00 |

OTHER PUBLICATIONS

"International Search Report and Written Opinion Issued in PCT Application No. PCT/US2019/026421", dated Jul. 23, 2019, 10 Pages.

"Office Action Issued in European Patent Application No. 19719056. 4", dated May 4, 2022, 6 Pages.

* cited by examiner

TECHNIQUES FOR CURATING THREAT INTELLIGENCE DATA

BACKGROUND

Threat intelligence data is currently collected from many sources and can include data that is proprietary to those sources. For example, the threat intelligence data may identify possible threats posed to a computer by a collection of entities, where the entities can include a file, which can be identified by a file hash, another computer, which can be identified by a network address, such as an internet protocol (IP) address, or other entities. The entities posing a potential threat can be identified and reported by data analysts, and the data analysts can also associate a reputation score, or some other indicator of likelihood of a threat, to the entities. The reputation score can be one of the data that is proprietarily computed by the given source of threat intelligence data, and thus may not use the same scale, enumerations, etc. as other sources. The differences in threat intelligence data from the different sources may convolute effective utilization of the data for the purpose of identifying, rating, or otherwise analyzing threats. In addition, threat intelligence data may become stale or outdated, which may cause erroneous assessment of the threat intelligence data.

SUMMARY

The following presents a simplified summary of one or more implementations in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations in a simplified form as a prelude to the more detailed description that is presented later.

In an example, a computer implemented method for curating threat intelligence data is provided. The method includes receiving threat intelligence data comprising a list of a first type of entities, a list of a second type of entities, one or more associations between at least one of the first type of entities and at least one of the second type of entities, and a reputation score for each entity in the list of the first type of entities and the list of the second type of entities. The method also includes receiving a confidence value corresponding to the one or more associations, determining an updated reputation score for at least one of the first type of entities based at least in part on the confidence value and on determining a reputation score of at least one of the second type of entities to which the at least one of the first type of entities is associated in the one or more associations, and updating, in the threat intelligence data, the reputation score of the at least one of the first type of entities to the updated reputation score.

In another example, a device for curating threat intelligence data is provided. The device includes a memory for storing threat intelligence data and one or more parameters or instructions for curating the threat intelligence data, and at least one processor coupled to the memory. The at least one processor is configured to receive the threat intelligence data comprising a list of a first type of entities, a list of a second type of entities, one or more associations between at least one of the first type of entities and at least one of the second type of entities, and a reputation score for each entity in the list of the first type of entities and the list of the second type of entities. The at least one processor is also configured to receive a confidence value corresponding to the one or more associations, determine an updated reputation score for at least one of the first type of entities based at least in part on the confidence value and on determining a reputation score of at least one of the second type of entities to which the at least one of the first type of entities is associated in the one or more associations, and update, in the threat intelligence data, the reputation score of the at least one of the first type of entities to the updated reputation score.

In another example, a computer-readable medium, including code executable by one or more processors for curating threat intelligence data is provided. The code includes code for receiving threat intelligence data comprising a list of a first type of entities, a list of a second type of entities, one or more associations between at least one of the first type of entities and at least one of the second type of entities, and a reputation score for each entity in the list of the first type of entities and the list of the second type of entities. The code also includes code for receiving a confidence value corresponding to the one or more associations, determining an updated reputation score for at least one of the first type of entities based at least in part on the confidence value and on determining a reputation score of at least one of the second type of entities to which the at least one of the first type of entities is associated in the one or more associations, and updating, in the threat intelligence data, the reputation score of the at least one of the first type of entities to the updated reputation score.

To the accomplishment of the foregoing and related ends, the one or more implementations comprise the features hereinafter fully described and particularly pointed out in the claims. The following description and the annexed drawings set forth in detail certain illustrative features of the one or more implementations. These features are indicative, however, of but a few of the various ways in which the principles of various implementations may be employed, and this description is intended to include all such implementations and their equivalents.

DETAILED DESCRIPTION

Figure 1:
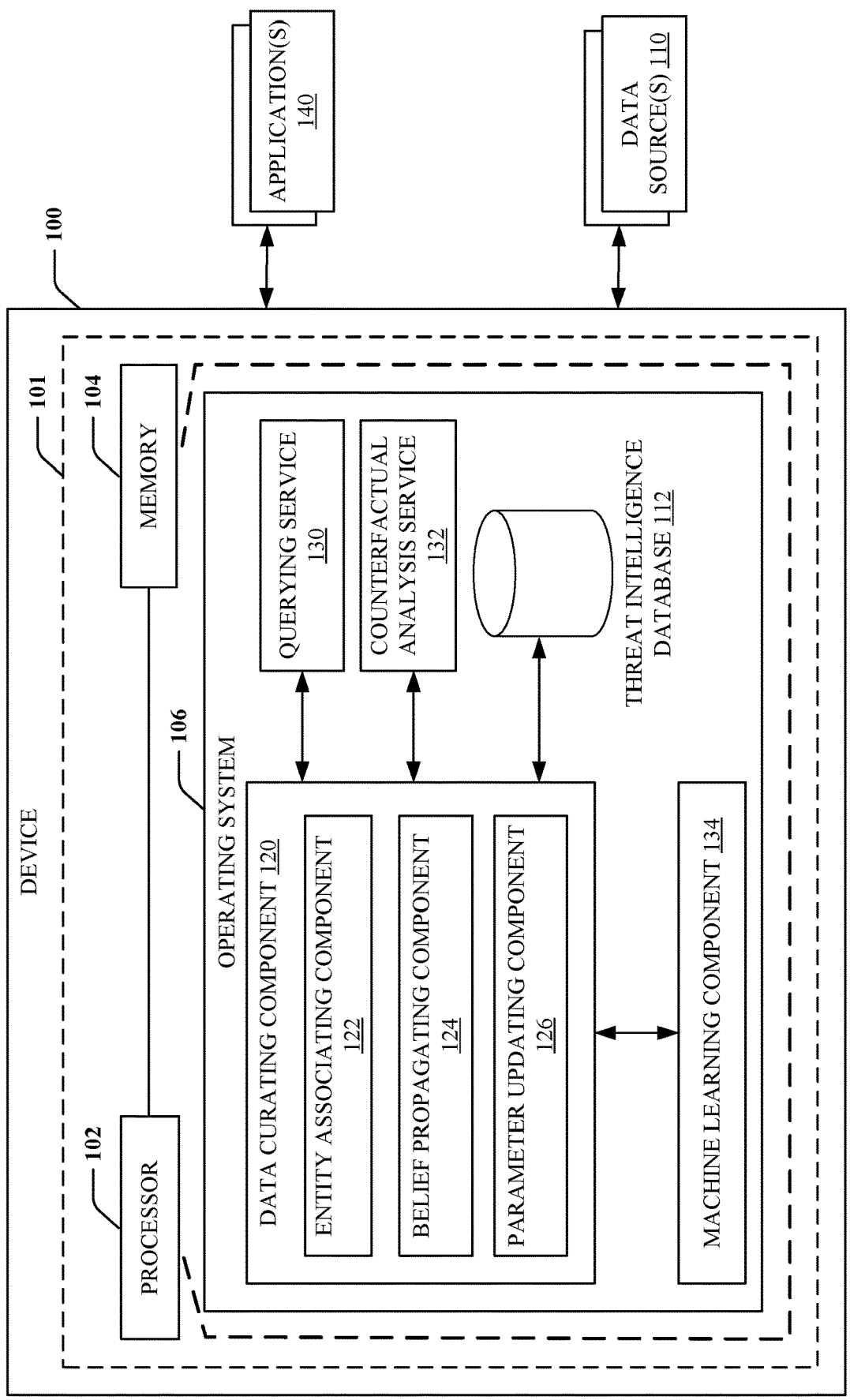
FIG. 1 is a schematic diagram of an example of a device that can curate threat intelligence data in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to curating threat intelligence data from various sources. For example, the amount of threat intelligence data available from different sources (e.g., threat intelligence detection software vendors, blog posts on the Internet, etc.) can be vast, and there is currently no mechanism to correlate or maintain data from the various sources. For example, given threat intelligence data from multiple sources, certain parameters related to entities identified as posing a possible threat may be proprietary to the sources. In addition, similar threat intelligence data from the various sources may be associated with different expiration times. This may lead to expired threat intelligence data being incorrectly consumed and erroneous reputation scores for entities may be generated based on the expired data. In addition, such inconsistencies in the data may convolute analysis of the data by a data analyst and/or may generate false positives in a machine-learning algorithm applied for determining trends in the threat intelligence data.

In this regard, for example, aspects described herein improve interactions with threat intelligence data at least in part by allowing one or more parameters of the threat intelligence data to be updated to a normalized value to allow for improved association of the threat intelligence data. In one example, entities posing a possible threat can be identified from the threat intelligence data, where the entities can be of different types, including files (e.g., identified by file hash), computers (e.g., identified by network address, such as interne protocol (IP) address), or other entities. Entities of different types can be associated with one another and the association can be used to determine a reputation score for one or more of the entities. In curating the data, for example, where a computer communicates certain files, the files may be associated with the computer, and a reputation score for the computer can be updated based on a reputation score for one or more of the files. Similarly, for example, a reputation score for one or more of the files can be updated based on a reputation score for one or more computers that communicate the file. Curating the threat intelligence data in this regard can allow for more intuitive association of the data for threat identification, rating, or other analysis, whether by a data analyst analyzing the data, a machine-learning model being applied to the data, or other person or device capable of obtaining and processing the threat intelligence data (e.g., via a user interface or API).

In addition, by curating the threat intelligence data in this regard, additional improvements are provided at least by allowing analysis of the threat intelligence data. For example, the curated threat intelligence data can be used for subsequent analysis to identify and/or rate threats. For example the curated threat intelligence data can be queried to determine one or more threats. In another example, counterfactual analysis can be performed using the curated threat intelligence data by allowing modification of one or more parameters (e.g., reputation score) associated with one or more entities to determine a modification of another reputation score of one or more other entities. Using the curated threat intelligence data allows for more intuitive updating of the reputation scores in these examples. For example, in performing the counterfactual analysis, the one or more parameters of the one or more entities (e.g., received via an interface) can be updated temporarily, and a belief propagation process can be executed based on the updated parameters (e.g., which may be similar to re-executing the curating process taking one or more parameter values as true). In addition, a machine-learning model can be trained with the threat intelligence data, which may result in an improved model at least by virtue of the threat intelligence data being curated or having normalized parameter values (e.g., normalized reputation scores).

Figure 2:
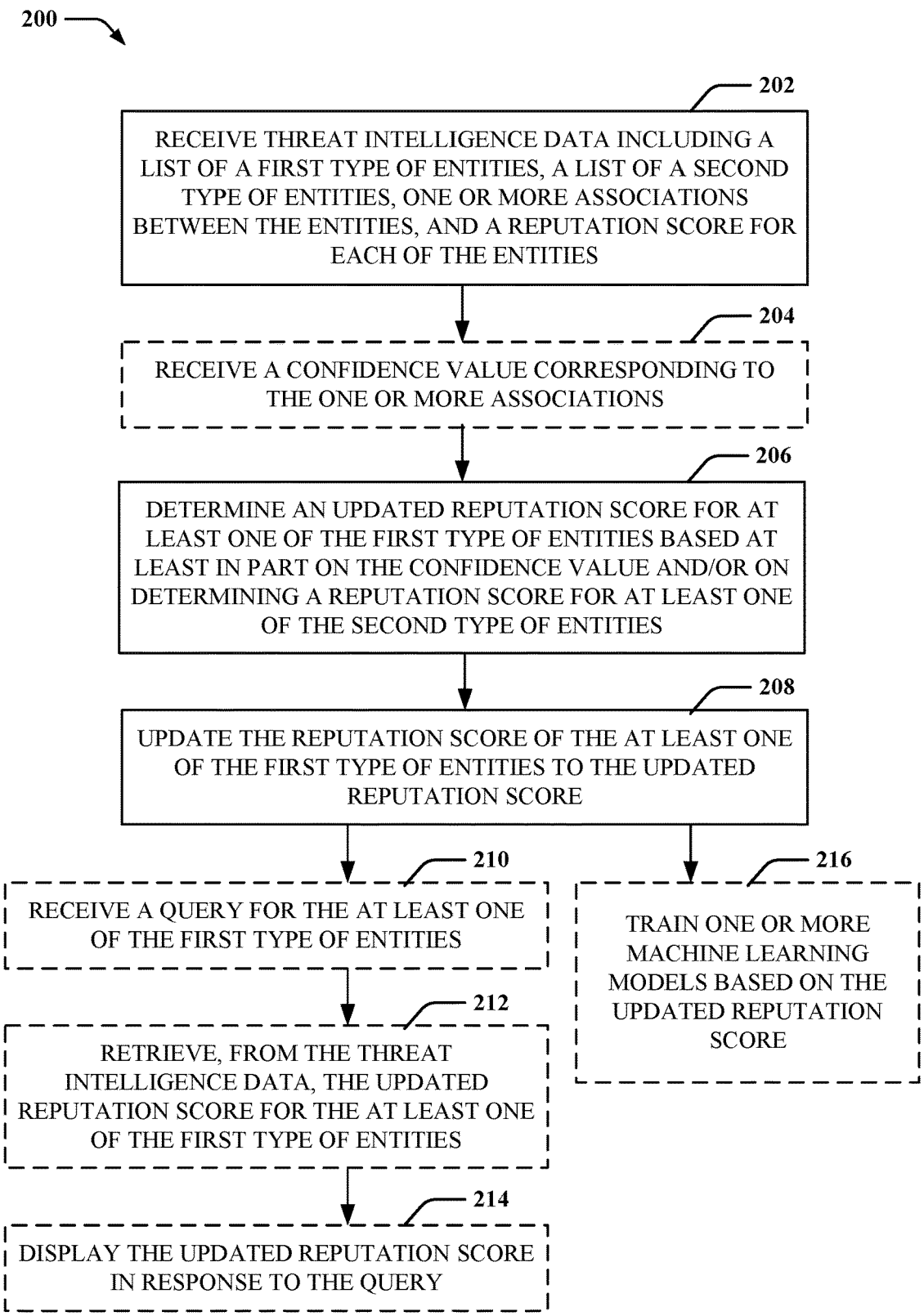
FIG. 2 is a flow diagram of an example of a method for curating threat intelligence data from various sources in accordance with examples described herein.
Figure 3:
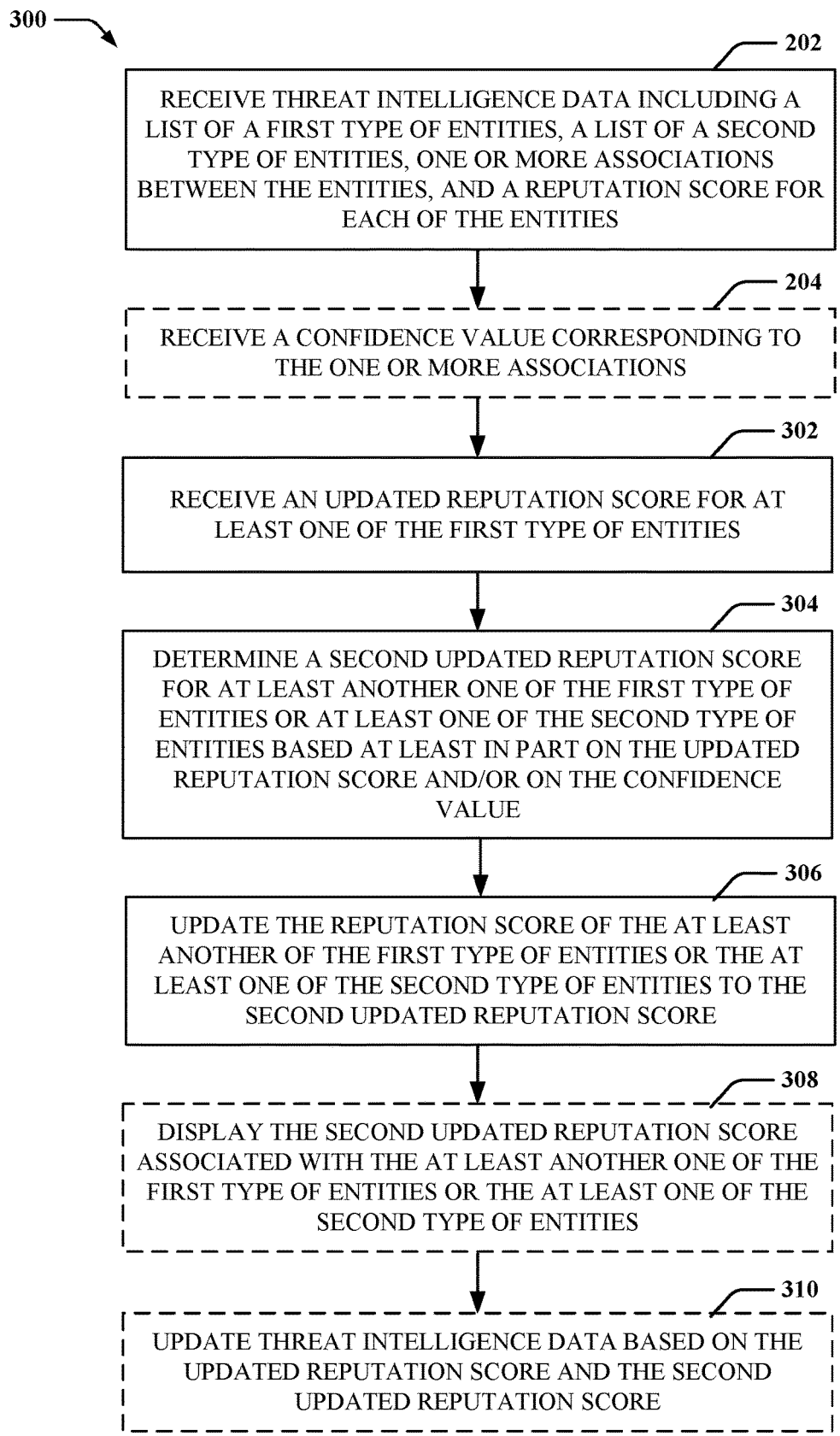
FIG. 3 is a flow diagram of an example of a method for performing counterfactual analysis of curated threat intelligence data in accordance with examples described herein.
Figure 4:
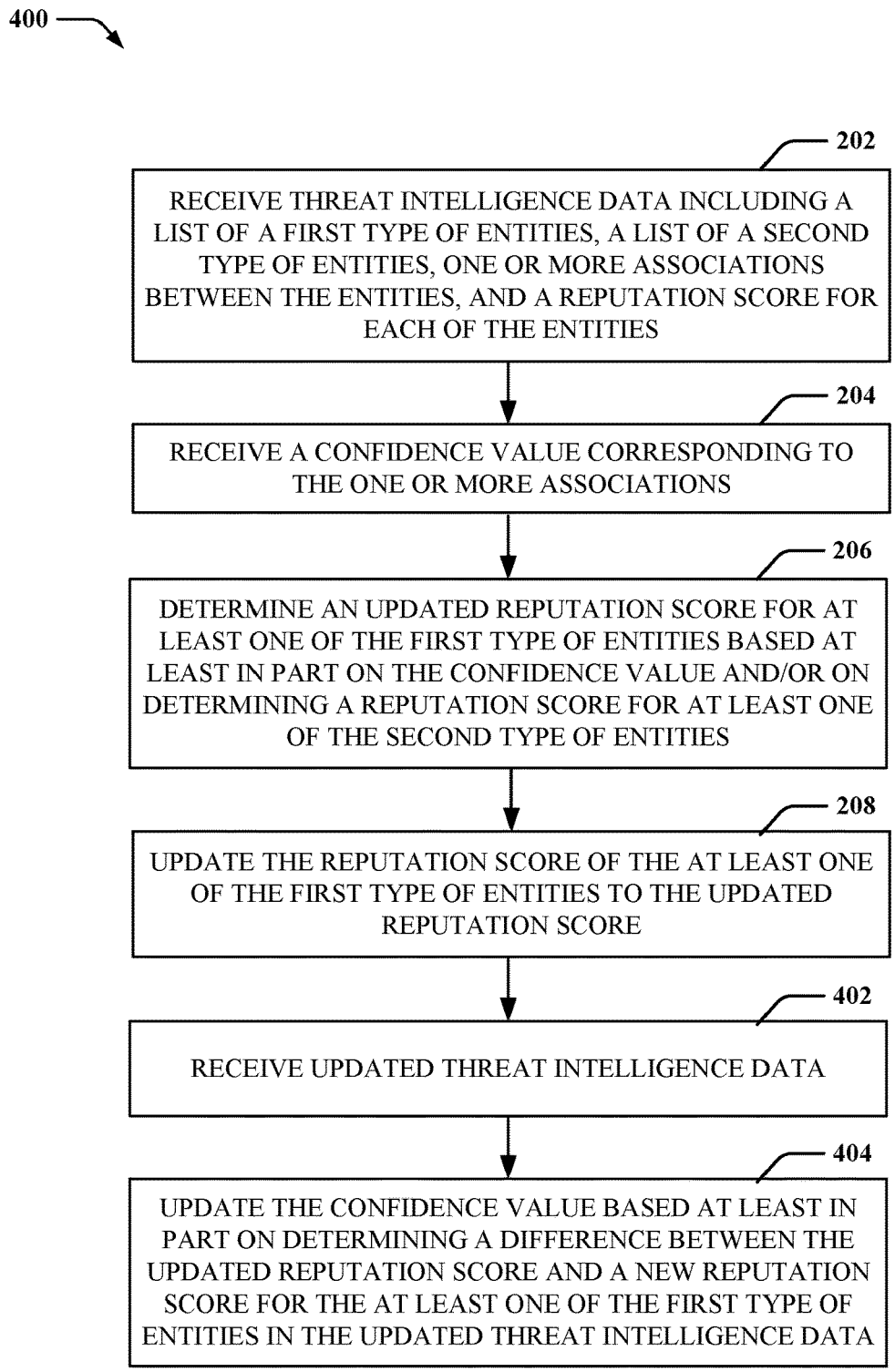
FIG. 4 is a flow diagram of an example of a method for updating confidence values related to threat intelligence data in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIGS. 2-4 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a device 100 (e.g., a computing device) that can curate threat intelligence data for improved processing, detection, or other consumption thereof. In an example, device 100 can include a processor 102 and/or memory 104 configured to execute or store instructions or other parameters related to providing an operating system 106, which can execute a data curating component 120, services 130, or other components/services. For example, processor 102 and memory 104 may be separate components communicatively coupled by a bus (e.g., on a motherboard or other portion of a computing device, on an integrated circuit, such as a system on a chip (SoC), etc.), components integrated within one another (e.g., processor 102 can include the memory 104 as an on-board component 101), and/or the like. Memory 104 may store instructions, parameters, data structures, etc., for use/execution by processor 102 to perform functions described herein. In addition, processor 102 and/or memory 104 may include one or more components that are distributed over multiple devices (not shown) and/or each of the multiple devices can execute one or more of the described components.

Operating system 106 may include a data curating component 120 for collecting, storing, and/or curating threat intelligence data from multiple data sources 110 in a threat intelligence database 112. For example, data curating component 120 can operate as a service, application, etc. on operating system 106 to receive the threat intelligence data from the various data sources 110 (e.g., via an application programming interface (API) request, a publish/subscribe request, etc.), to curate the threat intelligence data, as described further herein, to allow for retrieval and/or counterfactual analysis of the data, etc. For example, the data sources 110 may correspond to other devices with which the device 100 can communicate to receive threat intelligence data and/or data otherwise imported from such sources in real-time (or near real-time), in batch processing, etc. by another service. In an example, the data sources 110 can be managed by vendors associated with threat identification and/or remediation, such as virus scanning and/or removal software. The data sources 110 may also include blog posts or other content from which information about potentially malicious entities can be mined or otherwise discerned.

The threat intelligence data obtained from the data sources 110, for example, may include an identification of certain types of entities that may pose a threat, such as one or more computers (e.g., identified by network address, such as IP address, domain, account, and/or the like), one or more files (e.g., identified by a file hash, file properties, email or other tag information, metadata, and/or the like), etc., such that a threat identifying component can scan a device to determine presence of the one or more files, communications with the one or more computers, etc. The threat intelligence data obtained from the data sources 110 may also include one or more related parameters, such as a reputation score for the entities indicating whether the entities more or less likely to pose a threat. For example, the reputation score can be a numeric value, a letter grading, or substantially any enumeration used to indicate a relative threat level.

In any case, data curating component 120 can collect the threat intelligence data from the multiple data sources 110 and can store the threat intelligence data (or data generated based on the threat intelligence data) in the threat intelligence database 112. Data curating component 120, in an example, can also curate the data stored in the threat intelligence database 112 to normalize one or more parameters in the threat intelligence data. For example, data curating component 120 can include an entity associating component 122 for determining an association between entities in the threat intelligence data, a belief propagating component 124 for updating the threat intelligence data of one or more entities based on updating one or more parameters of one or more other entities in the threat intelligence data. Data curating component 120 may also include a parameter updating component 126 for allowing updating of the one or more threat intelligence data parameters of the one or more entities for, or as a result of, performing of a belief propagation process by the belief propagating component 124.

For example, given the threat intelligence data from multiple sources, entity associating component 122 can determine associations between entities (e.g., between files and devices), which may be indicated in the threat intelligence data as received, and belief propagating component 124 can execute a belief propagation process regarding the determined associations to normalize one or more parameters (e.g., reputation score) of the entities (or at least of one or more of the types of entities) in the threat intelligence data. In addition, for example, belief propagating component 124 can execute a belief propagation and can determine whether to expire the entity from the threat intelligence database 112 based at least in part on a corresponding parameter value (e.g., based on detecting a difference in multiple reputation scores reported for the entity that achieves or exceeds a threshold difference). In this example, such an entity can be expired from the threat intelligence database 112 and/or reassessed to possibly assign a different reputation score.

In addition, data curating component 120 can communicate with other components or services to facilitate analysis and/or modification of the threat intelligence data in the threat intelligence database 112. For example, operating system 106 may include a querying service 130 that facilitates querying the threat intelligence database 112 to receive updated parameters for one or more of the entities (e.g., updated based on curating the data, executing a belief propagation algorithm based on modifying one or more parameters, etc.). In another example, operating system 106 may include a counterfactual analysis service 132 that facilitates modifying one or more parameters associated with one or more entities in the threat intelligence database 112 (e.g., at least temporarily and/or as part of a copy of data in the database) such that belief propagating component 124 can execute the belief propagation process based on the modified parameter(s) to update one or more other parameters for one or more other entities, which can allow for evaluating changes to the threat identification data based on modifying the one or more parameters.

One or more applications 140 operating on the device 100 or other devices can execute and leverage the services 130, 132 via one or more APIs, and/or the like. For example, the application 140 can execute an instance of the service 130, 132 via a webpage in a web browser, an application that communicates with the service 130, 132, and/or the like, on a device (not shown) that may be remotely located from the device 100. For example, the data curating component 120 may be operable for initializing and executing the service 130, 132 or one or more contexts of the service, configuring one or more parameters for executing the service 130, 132 etc. For example, a context of the service can relate to an execution of the service 130, 132 given a set of parameters configured by the data curating component 120.

Operating system 106 may also include a machine learning component 134 for training machine learning models based on the curated data in the threat intelligence database 112. For example, the trained machine learning models may be used to identify possible threats based on detecting trends in associations among the entities indicated by the threat intelligence data.

FIG. 2 is a flowchart of an example of a method 200 for curating reputation scores of entities in threat intelligence data. For example, method 200 can be performed by a device 100, and/or one or more components thereof, to update/normalize parameters of, or otherwise curate, the threat intelligence data.

In method 200, at action 202, threat intelligence data can be received, where the threat intelligence data includes a list of a first type of entities, a list of a second type of entities, one or more associations between the entities, and a reputation score for each of the entities. In an example, data curating component 120, e.g., in conjunction with processor 102, memory 104, operating system 106, etc., can receive the threat intelligence data (e.g., from multiple data sources 110) including the list of a first type of entities, the list of a second type of entities, the one or more associations between the entities, and the reputation score for each of the entities. The threat intelligence data can include parameters for other types of entities as well, may include additional parameters other than reputation score, etc. In addition, the one or more parameters (e.g., including reputation score) may be proprietary to the data source from which the data is received or otherwise not normalized among data sources 110. Data curating component 120 can store the threat intelligence data in the threat intelligence database 112 for subsequent curating, analysis, or other manipulation, etc., as described herein.

In a specific example, the list of the first type of entities may include a list of devices identified by one or more device parameters, such as a network address (e.g., IP address, media access control (MAC) address, etc.), and the list of the second type of entities may include a list of files identified by one or more file parameters, such as a file hash value computed by applying a hash function to at least a portion of the file. Each of the devices and files in the received threat intelligence data may have an associated reputation score that indicates a relative threat determined for the entity (e.g., as a Boolean value representing a possible threat or not a possible threat, a percentage or other floating point value between 0 and 1 representing a predicted degree of threat, a letter grade or numeral value representing the predicted degree of threat, etc.). For example, the reputation score may indicate a likelihood that the entity is malicious or is associated with potentially malicious activity.

In addition, the threat intelligence data received from the multiple data sources 110 may include an indication of association between ones of the different types of entities (e.g., between ones of the first type of entities and the second type of entities). For example, the association(s) may include one-to-one associations between different types of entities, one-to-many associations between an entity of a first type and multiple entities of a second type (and/or other types). In the specific example above, the threat intelligence data may identify an association between a device and a file (and/or between the device and multiple files) for multiple ones of the devices. In addition, the threat intelligence data may identify an association between a file and a device (and/or between the file and multiple devices) for multiple ones of the files. In one specific example, the threat intelligence data can be received as, or otherwise interpreted by the entity associating component 122 as, a bipartite graph including nodes for each of the entities (e.g., a first set of nodes for the devices and a second set of nodes for the files) with edges connecting ones of the first set of nodes to ones of the second set of nodes to indicate the associations. Thus, for example, data curating component 120 can store the threat intelligence data in a format consistent with a bipartite graph (e.g., a list of the nodes and a list of edge information for connecting the nodes).

In method 200, optionally at action 204, a confidence value corresponding to the one or more associations can be received. In an example, entity associating component 122, e.g., in conjunction with processor 102, memory 104, operating system 106, data curating component 120, etc., can receive the confidence value corresponding to the one or more associations. In an example, the entity associating component 122 can generate the confidence value for the one or more associations based on various considerations regarding the threat intelligence data, which may include a data source (or sources) 110 from which the threat intelligence data is received (e.g., sources deemed more reliable can result in higher associated confidence values for the indicated associations, similar association data from multiple sources can result in a higher confidence value, etc.). In an example, entity associating component 122 can store the confidence value in the threat intelligence database 112 with the threat intelligence data (e.g., as associated with the association between entities).

In method 200, at action 206, an updated reputation score can be determined for at least one of the first type of entities based at least in part on the confidence value and/or on determining a reputation score for at least one of the second type of entities. In an example, belief propagating component 124, e.g., in conjunction with processor 102, memory 104, operating system 106, data curating component 120, etc., can determine the updated reputation score for at least one of the first type of entities (e.g., a device or file) based at least in part on the confidence value and/or on determining the reputation score for at least one of the second type of entities (e.g., a file where the first type is device, or a device where the first type is file).

In an example, belief propagating component 124 can update the reputation score for one or more of the entities as part of a belief propagating process where the belief propagating component 124, based on a set of parameters taken as true for a set of entities, can update the parameters for other entities. For example, in performing the belief propagating process, the belief propagating component 124 can determine, for a first entity having a parameter (e.g., reputation score) taken as true, a second entity associated with the first entity (e.g., based on a stored association). Based on the reputation score of the first entity and the confidence value for the association (and/or the original reputation score for the second entity), the belief propagating component 124 can update the reputation score for the second entity. In another example, belief propagating component 124 can additionally or alternatively update the reputation score for the second entity based on a number of entities of the first type that are associated with the second entity, the corresponding reputation scores for the entities of the first type, etc. In any case, for example, when the second entity reputation score is updated, it can be used to update the reputation score for other entities, and so on, until the belief propagation process is completed. Moreover, the reputation score of the first entity can be used to update reputation scores for other entities (e.g., entities of the second type, entities of the first type that may be associated with similar entities of the second type, etc.). In addition, for example, various entities can be considered as having true reputation score values for the purpose of propagating the belief(s) throughout the threat intelligence data.

In method 200, at action 208, the reputation score of the at least one of the first type of entities can be updated to the updated reputation score. In an example, parameter updating component 126, e.g., in conjunction with processor 102, memory 104, operating system 106, data curating component 120, etc., can update the reputation score of the at least one of the first type of entities to the updated reputation score. For example, parameter updating component 126 can update the reputation score associated with the entity in the threat intelligence database 112. In another example, parameter updating component 126 can update the reputation score associated with the entity in a copy of the threat intelligence database 112, or other temporary storage, to facilitate counterfactual analysis, as described herein. In any case, curating the threat intelligence data in this regard can facilitate querying of the data having normalized parameter values to allow for more accurate data analysis/manipulation. In some examples, detecting a threshold difference or inconsistency in reported and/or normalized parameter values can cause parameter updating component 126 to expire an entity from the threat intelligence database 112. In one example, the entity may be reevaluated in subsequent data curation where it is again received from one or more data sources 110.

In method 200, optionally at action 210, a query for the at least one of the first type of entities can be received. In an example, data curating component 120, e.g., in conjunction with processor 102, memory 104, operating system 106, etc., can receive the query for the at least one of the first type of entities (e.g., via querying service 130). For example, the querying service 130 can provide an interface to facilitate querying the threat intelligence data (e.g., in the form of a user interface provided on an application 140, an API for programmatically requesting and receiving threat intelligence data via the application 140, etc.).

In response to the query, optionally at action 212, the updated reputation score for the at least one of the first type of entities can be retrieved from the threat intelligence data. In an example, data curating component 120, e.g., in conjunction with processor 102, memory 104, operating system 106, etc., can retrieve the updated reputation score for the at least one of the first type of entities (e.g., along with other data that may correspond to the query). For example, data curating component 120 can retrieve the reputation scores and/or associated data by querying the threat intelligence database 112.

In addition, in an example, optionally at action 214, the updated reputation score can be displayed in response to the query. In an example, application 140, e.g., in conjunction with a processor, memory, operating system, etc. of a device executing the application 140, can display the updated reputation score in response to the query. Thus, in this example, a data analyst can retrieve, view, and consume the updated reputation score in performing analysis of the threat intelligence data from the various sources.

In another example, optionally at action 216, one or more machine learning models can be trained based on the updated reputation score. In an example, machine learning component 134, e.g., in conjunction with processor 102, memory 104, operating system 106, etc., can train the one or more machine learning models based on the updated reputation score. For example, machine learning component 134 can use the updated reputation score along with other input parameters (e.g., the confidence values for associations between entities, etc.) to the machine learning model to train the model. Using the machine learning model, for example, the machine learning component 134 may identify potential additional threats based on the threat intelligence data, and/or may indicate the identified potential threats via an interface.

For example, based on the trained model, a homophilic property may be observed where a device determined to be a potential threat may also have multiple files determined to be potential threats. Thus, the machine learning component 134 may use this property to identify other devices with the same or similar files, a similar number of multiple potentially threatening files, etc. to determine the device as posing a potential threat. In one example, the aforementioned belief propagation process may be performed based on the trained model. In this example, based on the trained model, the belief propagating component 124 may identify a file with an unsure reputation score (e.g., 0.5 on a scale of 0 to 1) associated with a device having a potentially threatening reputation score (e.g., closer to 0). In this example, belief propagating component 124 can lower the reputation score of the file in the threat intelligence database 112.

In another example, the machine learning component 134 may observe, based on the trained model, an accuracy of scoring an entity as a threat by a certain data source 110 as being higher than other sources, and machine learning component 134 may accordingly increase confidence values in associations related to the certain data source 110, increase (or decrease) reputation scores for entities reported by the certain data source 110, etc. to use machine learning in analyzing the threat intelligence data.

FIG. 3 is a flowchart of an example of a method 300 for facilitating counterfactual analysis of curated reputation scores of entities in threat intelligence data. For example, method 300 can be performed by a device 100, and/or one or more components thereof, to initiate a counterfactual scenario for determining an outcome associated with the threat intelligence data.

Method 300 can include actions 202 and 204, as described above in reference to method 200 of FIG. 2. Thus, at action 202, threat intelligence data can be received, where the threat intelligence data includes a list of a first type of entities, a list of a second type of entities, one or more associations between the entities, and a reputation score for each of the entities. In an example, data curating component 120, e.g., in conjunction with processor 102, memory 104, operating system 106, etc., can receive the threat intelligence data (e.g., from multiple data sources 110) including the list of a first type of entities, the list of a second type of entities, the one or more associations between the entities, and the reputation score for each of the entities, as described. In addition, optionally at action 204, a confidence value corresponding to the one or more associations can be received. In an example, entity associating component 122, e.g., in conjunction with processor 102, memory 104, operating system 106, data curating component 120, etc., can receive the confidence value corresponding to the one or more associations.

In method 300, at action 302, an updated reputation score can be received for at least one of the first type of entities. In an example, parameter updating component 126, e.g., in conjunction with processor 102, memory 104, operating system 106, data curating component 120, etc., can receive the updated reputation score for the at least one of the first type of entities. As described, for example, data curating component 120 can communicate with a counterfactual analysis service 132 to facilitate modification of reputation scores or other parameters associated with one or more entities (e.g., by providing an interface to or via an application 140). In this regard, the counterfactual analysis service 132 may allow a user to set the parameter value for the purposes of performing counterfactual analysis and/or to permanently (or semi-permanently) set the parameter value in the threat intelligence database 112. In another example, counterfactual analysis service 132 can make a copy of the database or otherwise separately track modifications so the threat intelligence database 112 is not actually modified for the purpose of the counterfactual analysis. In any case, parameter updating component 126 can update the parameter based on input from the counterfactual analysis service 132. In addition, parameter updating component 126 may update multiple parameter values for multiple entities in this regard.

In method 300, at action 304, a second updated reputation score for at least another one of the first type of entities or at least one of the second type of entities can be determined based at least in part on the updated reputation score and/or on the confidence value. In an example, belief propagating component 124, e.g., in conjunction with processor 102, memory 104, operating system 106, data curating component 120, etc., can determine the second updated reputation score for at least another one of the first type of entities or the at least one of the second type of entities based at least in part on the updated reputation score (for the at least one of the first type of entities) and/or on the confidence values. For example, belief propagating component 124 can determine the second updated reputation score as part of a belief propagation process, as described above, based at least in part on taking the updated reputation score for the at least one of the first type of entities as true. In one example, the belief propagation process may be initiated based on updating of the reputation score, a command from the counterfactual analysis service 132 to start the process (e.g., which may be based on a command received via a user interface provided to or by an application 140, etc.).

In method 300, at action 306, the reputation score of the at least another one of the first type of entities or the at least one of the second type of entities can be updated to the second updated reputation score. In an example, parameter updating component 126, e.g., in conjunction with processor 102, memory 104, operating system 106, data curating component 120, etc., can update the reputation score of the at least another of the first type of entities or the at least one of the second type of entities to the second updated reputation score. For example, parameter updating component 126 can update the reputation score associated with the entity in the threat intelligence database 112, or in a copy thereof, or in another mechanism for tracking changes to the threat intelligence database 112, such that the threat intelligence database 112 data is not necessarily impacted by the update or can otherwise be restored to a state prior to executing the belief propagation process. In any case, curating the threat intelligence data based on the indicated belief for one or more parameters can facilitate counterfactual analysis of the data to determine changes that may result if beliefs of threat level or other parameters (e.g., reputation score) for certain entities are taken as true. In other examples, other graph processes may be similarly performed, such as graph centrality scoring, shortest path processes, label propagation processes, etc. In one example, as described further herein, where receiving the updated reputation score includes an analyst updating the reputation score and/or adding entities to the graph in performing counterfactual analysis, graph centrality scoring changes can be evaluated to determine how the additional entity and/or updated reputation score impacts other nodes in the graph. Additionally, a clustering technology typically associated with such graph processes can be used to execute such processes to provide high performance of processing and modifying values of the graph.

In method 300, optionally at action 308, the second updated reputation score can be displayed as associated with the at least another one of the first type of entities or the at least one of the second type of entities. In an example, application 140, e.g., in conjunction with a processor, memory, operating system, etc. of a device executing the application 140, can display the second updated reputation score in response to a query or in response to modification of a parameter value of an entity in the threat intelligence data, as described above. Thus, in this example, a data analyst can retrieve, view, and consume the updated reputation score in performing counterfactual analysis of the threat intelligence data.

In method 300, optionally at action 310, the threat intelligence data can be updated based on the updated reputation score and the second updated reputation score. In an example, parameter updating component 126, e.g., in conjunction with processor 102, memory 104, operating system 106, data curating component 120, etc., can update the threat intelligence data based on the updated reputation score and the second updated reputation score. For example, parameter updating component 126 can update the threat intelligence database 112 with the updated reputation score and/or the second updated reputation scores(s) revised based on performing the belief propagation process based on the updated reputation score. Thus, for example, where an analyst determines the updated reputation score is accurate with high confidence (e.g., based on the counterfactual analysis), the results can be modified in the threat intelligence database 112 in this regard (e.g., and used in subsequent analysis).

In a specific example, where the first type of entity is a device, the parameter updating component 126 can receive an updated reputation score for at least one of the devices (e.g., via a user interface provided by a counterfactual analysis service 132, etc.), and parameter updating component 126 can update the reputation score for the entity in the threat intelligence database 112 (or a copy thereof or separate changes tracking mechanism, as described). In this example, belief propagating component 124 can then execute a belief propagating process to determine updated reputation values for other entities based on updating the reputation score for the at least one device. For example, belief propagating component 124 can determine whether to accordingly update reputation scores for one or more files having an indicated association with the at least one device, whether to accordingly update reputation scores for one or more devices having an indicated association with the one or more files whose reputation scores may have been updated, and so on until the process completes. In addition, parameter updating component 126 can allow for updating parameter values associated with files as well, and belief propagating component 124 can similarly determine updated reputation scores or other parameter values for other devices associated with the files and/or files associated with the associated devices, etc.

In a specific example, data curating component 120 can provide a representational state transfer (REST) API that allows the querying service 130 to request retrieval of data related to one or more specific entities. In another example, the REST API can allow counterfactual analysis service 132 to request modification of the parameter values in the threat intelligence database 112, run the belief propagation process, obtain revised parameter values for other entities based on modifying the parameter value, etc. As described, such modification can be made to a copy of the threat intelligence database 112 or other mechanism for making temporary changes so the user need not worry about overwriting data in the threat intelligence database 112 in performing the counterfactual analysis.

Additionally, in a specific example, the threat intelligence database 112 can be a graph database for storing a representation of a bipartite graph, as described above. Using a graph database can facilitate efficient query execution on a large graph while using minimal compute resources. For example, several collections within the graph database can be used—e.g., one collection for maintaining the entire threat intelligence graph (as a primary data source), other collections for reading/writing results of counterfactual analysis, etc. This separation allows an analyst to repeatedly modify graph entities during counterfactual analysis without worrying about changing the original data source. In one example, upon making a high-confidence assessment, the analyst can choose to store results into the original threat intelligence database 112 (e.g., by updating the threat intelligence database 112 as described in reference to action 310). In this regard, the counterfactual analysis service 132 may also provide a function to modify the data in the actual threat intelligence database 112 (e.g., which can be provided as an option via application 140).

FIG. 4 is a flowchart of an example of a method 400 for facilitating updating confidence values of associations between entities based on feedback. For example, method 400 can be performed by a device 100, and/or one or more components thereof, to update a confidence value corresponding to an association between entities.

Method 400 can include actions 202, 204, 206, 208, as described above in reference to method 200 of FIG. 2. Thus, at action 202, threat intelligence data can be received, where the threat intelligence data includes a list of a first type of entities, a list of a second type of entities, one or more associations between the entities, and a reputation score for each of the entities. In an example, data curating component 120, e.g., in conjunction with processor 102, memory 104, operating system 106, etc., can receive the threat intelligence data (e.g., from multiple data sources 110) including the list of a first type of entities, the list of a second type of entities, the one or more associations between the entities, and the reputation score for each of the entities, as described. In addition, at action 204, a confidence value corresponding to the one or more associations can be received. In an example, entity associating component 122, e.g., in conjunction with processor 102, memory 104, operating system 106, data curating component 120, etc., can receive the confidence value corresponding to the one or more associations. Also, at action 206, an updated reputation score can be determined for at least one of the first type of entities based at least in part on the confidence value and/or on determining a reputation score for at least one of the second type of entities. In an example, belief propagating component 124, e.g., in conjunction with processor 102, memory 104, operating system 106, data curating component 120, etc., can determine the updated reputation score for at least one of the first type of entities (e.g., a device or file) based at least in part on the confidence value and/or on determining the reputation score for at least one of the second type of entities. Additionally, at action 208, the reputation score of the at least one of the first type of entities can be updated to the updated reputation score. In an example, parameter updating component 126, e.g., in conjunction with processor 102, memory 104, operating system 106, data curating component 120, etc., can update the reputation score of the at least one of the first type of entities to the updated reputation score.

In method 400, at action 402, updated threat intelligence data can be received. In an example, data curating component 120, e.g., in conjunction with processor 102, memory 104, operating system 106, etc., can receive the updated threat intelligence data, which can include receiving threat intelligence data from one or more data sources 110 for storing in the threat intelligence database 112, as described herein. For example, the updated threat intelligence data can be similarly formatted to the threat intelligence data received at action 302, but may apply to a subsequent period of time, and may thus include newer data on potential threats.

In method 400, at action 404, the confidence value can be updated based at least in part on determining a difference between the updated reputation score and a new reputation score for the at least one of the first type of entities in the updated threat intelligence data. In an example, parameter updating component 126, e.g., in conjunction with processor 102, memory 104, operating system 106, data curating component 120, etc., can update the confidence value based at least in part on determining the difference between the updated reputation score and the new reputation score for the at least one of the first type of entities in the updated threat intelligence data. For example, where the updated reputation score, updated as part of the belief propagation process, is similar to the newly received reputation score, this may indicate the confidence in the association between entities (e.g., that resulted in the updated reputation score) is correct or nearly correct (e.g., and/or can be a function of the difference). In this regard, parameter updating component 126 can accordingly update the confidence value based on the feedback of the updated threat intelligence data to reflect a confidence of the association between entities. For example, the updating of the confidence value can occur based on receiving the updated threat intelligence data. For example, parameter updating component 126 may update the confidence value as stored in or with the threat intelligence database 112.

Figure 5:
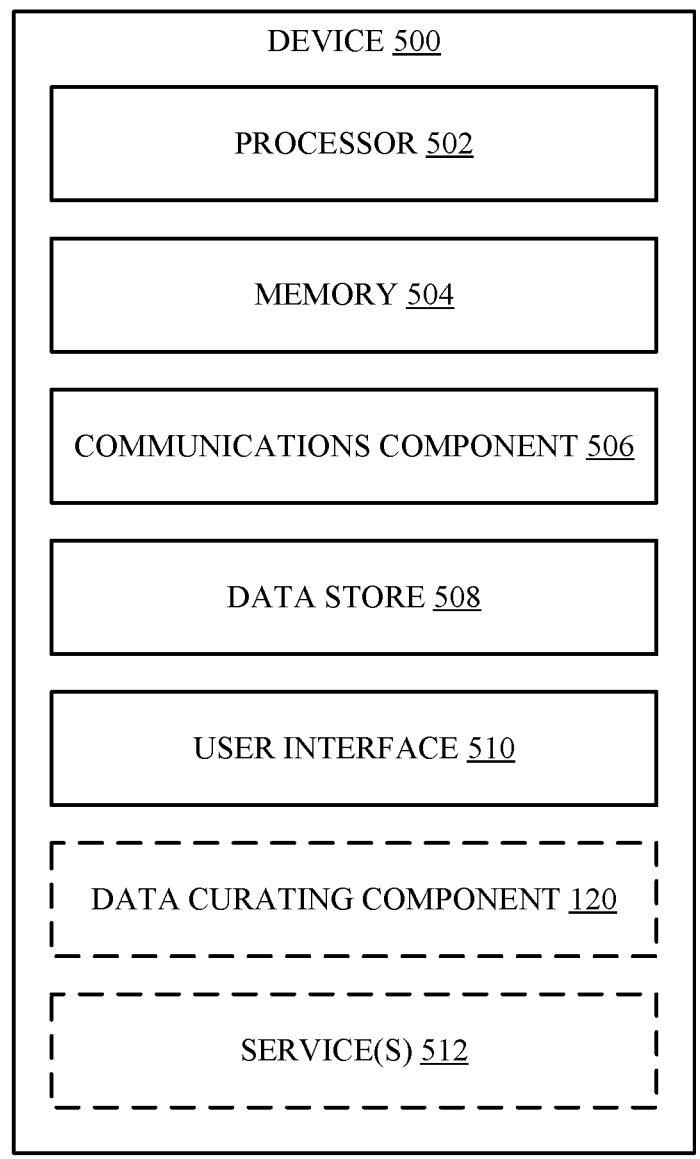
FIG. 5 is a schematic diagram of an example of a device for performing functions described herein.

FIG. 5 illustrates an example of device 500, similar to or the same as device 100 (FIG. 1) including additional optional component details as those shown in FIG. 1. In one implementation, device 500 may include processor 502, which may be similar to processor 102 for carrying out processing functions associated with one or more of components and functions described herein. Processor 502 can include a single or multiple set of processors or multi-core processors. Moreover, processor 502 can be implemented as an integrated processing system and/or a distributed processing system.

Device 500 may further include memory 504, which may be similar to memory 104 such as for storing local versions of applications being executed by processor 502, such as a data curating component 120, an operating system 106, other components thereof, applications (e.g., applications 140), service(s) 512 (e.g., querying service 130, counterfactual analysis service 132, etc.), related instructions, parameters, etc. Memory 504 can include a type of memory usable by a computer, such as random access memory (RAM), read only memory (ROM), tapes, magnetic discs, optical discs, volatile memory, non-volatile memory, and any combination thereof.

Further, device 500 may include a communications component 506 that provides for establishing and maintaining communications with one or more other devices, parties, entities, etc., utilizing hardware, software, and services as described herein. Communications component 506 may carry communications between components on device 500, as well as between device 500 and external devices, such as devices located across a communications network and/or devices serially or locally connected to device 500. For example, communications component 506 may include one or more buses, and may further include transmit chain components and receive chain components associated with a wireless or wired transmitter and receiver, respectively, operable for interfacing with external devices.

Additionally, device 500 may include a data store 508, which can be any suitable combination of hardware and/or software, that provides for mass storage of information, databases, and programs employed in connection with implementations described herein. For example, data store 508 may be or may include a data repository for applications and/or related parameters (e.g., data curating component 120, an operating system 106, other components thereof, applications, etc.) not currently being executed by processor 502. In addition, data store 508 may be or include a data repository for data curating component 120, such as the threat intelligence database 112, other components thereof, applications, and/or one or more other components of the device 500.

Device 500 may include a user interface component 510 operable to receive inputs from a user of device 500 and further operable to generate outputs for presentation to the user. User interface component 510 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 510 may include one or more output devices, including but not limited to a display, a speaker, a haptic feedback mechanism, a printer, any other mechanism capable of presenting an output to a user, or any combination thereof.

Device 500 may additionally include and/or be communicatively coupled with a data curating component 120, one or more services 512 (which may include a querying service 130, counterfactual analysis service 132, machine learning component 134, etc.), components thereof, etc. for providing the functionalities described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more implementations, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various implementations described herein. Various modifications to these implementations will be readily apparent to those skilled in the art, and the generic principles defined herein may be applied to other implementations. Thus, the claims are not intended to be limited to the implementations shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various implementations described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer implemented method for curating threat intelligence data, comprising:
    receiving, from each of multiple data sources, at least a portion of threat intelligence data, wherein the threat intelligence data comprises:
        a first list of entities of a first type, and for at least one first entity of the entities of the first type, a first reputation score, where the first reputation score indicates a relative threat of the at least one first entity in posing security threat, wherein the first type is an internet protocol (IP) address,
        a second list of entities of a second type, and for at least one second entity of the entities of the second type, a second reputation score, where the second reputation score indicates a relative threat of the at least one second entity in posing security threat, wherein the second type is a file hash, and
        an association between
        the at least one first entity and
        the at least one second entity;
    receiving a confidence value corresponding to a reliability of the association between
        the at least one first entity and
        the at least one second entity;
    determining a second updated reputation score for the at least one second entity;
    determining an updated reputation score for the at least one first entity based at least in part on the confidence value and based on the determining the second updated reputation score of the at least one second entity;
    updating, in the threat intelligence data, the first reputation score of the at least one first entity to the updated reputation score; and
    training, based on the threat intelligence data as updated to include the updated reputation score, a machine learning model to identify possible threats based on detecting trends in associations among entities indicated in the threat intelligence data.

2. The computer implemented method of claim 1, further comprising:
    receiving, via a user interface, a query for the at least one first entity;
    retrieving, from the threat intelligence data, the updated reputation score for the at least one first entity; and
    displaying, via the user interface, the updated reputation score in response to the query.

3. The computer implemented method of claim 1, further comprising receiving a request to update, in the threat intelligence data, a third reputation score of at least one third entity of the entities of the first type,
    wherein determining the updated reputation score of the at least one first entity is further based at least in part on updating, in the threat intelligence data, the third reputation score.

4. The computer implemented method of claim 3, wherein the request is received via a user interface.

5. The computer implemented method of claim 1, wherein the determining the second updated reputation score comprises receiving a request to update the second reputation score of the at least one second entity to the second updated reputation score.

6. The computer implemented method of claim 1, further comprising:
    receiving updated threat intelligence data including a third updated reputation score for the at least one first entity; and
    updating the confidence value corresponding to the reliability of the association based at least in part on determining a difference between the updated reputation score and the third updated reputation score.

7. The computer implemented method of claim 1,
wherein the first type comprises internet protocol (IP) addresses, and
wherein the second type comprises file hashes.

8. The computer implemented method of claim 1, further comprising training one or more machine learning models based on the updated reputation score.

9. A device for curating threat intelligence data, comprising:
a memory for storing threat intelligence data and one or more parameters or instructions for curating the threat intelligence data; and
at least one processor coupled to the memory, wherein the at least one processor is configured to:
receive, from each of multiple data sources, at least a portion of the threat intelligence data, wherein the threat intelligence data comprises:
a first list of entities of a first type, and for at least one first entity of the entities of the first type, a first reputation score, where the first reputation score indicates a relative threat of the at least one first entity in posing security threat, wherein the first type is an internet protocol (IP) address,
a second list of entities of a second type, and for at least one second entity of the entities of the second type, a second reputation score, where the second reputation score indicates a relative threat of the at least one second entity in posing security threat, wherein the second type is a file hash, and
an association between
the at least one first entity and
the at least one second entity;
receive a confidence value corresponding to a reliability of the association between
the at least one first entity and
the at least one second entity;
determine a second updated reputation score for the at least one second entity;
determine an updated reputation score for the at least one first entity based at least in part on the confidence value and based on the determining the second updated reputation score of the at least one second entity;
update, in the threat intelligence data, the first reputation score of the at least one first entity to the updated reputation score; and
train, based on the threat intelligence data as updated to include the updated reputation score, a machine learning model to identify possible threats based on detecting trends in associations among entities indicated in the threat intelligence data.

10. The device of claim 9, wherein the at least one processor is further configured to:
receive, via a user interface, a query for the at least one first entity;
retrieve, from the threat intelligence data, the updated reputation score for the at least one first entity; and
display, via the user interface, the updated reputation score in response to the query.

11. The device of claim 9, wherein the at least one processor is further configured to receive a request to update, in the threat intelligence data, a third reputation score of at least one third entity of the entities of the first type,
wherein the at least one processor is configured to determine the updated reputation score of the at least one first entity further based at least in part on updating, in the threat intelligence data, the third reputation score.

12. The device of claim 11, wherein the request is received via a user interface.

13. The device of claim 9, wherein the at least one processor is configured to determine the second updated reputation score at least in part by receiving a request to update the second reputation score of the at least one second entity to the second updated reputation score.

14. The device of claim 9, wherein the at least one processor is further configured to:
receive updated threat intelligence data including a third updated reputation score for the at least one first entity; and
update the confidence value corresponding to the reliability of the association based at least in part on determining a difference between the updated reputation score and the third updated reputation score.

15. The device of claim 9, wherein the first type comprises internet protocol (IP) addresses, and wherein the second type comprises file hashes.

16. A non-transitory computer-readable medium, comprising code executable by one or more processors for curating threat intelligence data, the code comprising code for:
receiving, from each of multiple data sources, at least a portion of threat intelligence data, wherein the threat intelligence data comprises:
a first list of entities of a first type, and for at least one first entity of the entities of the first type, a first reputation score, where the first reputation score indicates a relative threat of the at least one first entity in posing security threat, wherein the first type is an internet protocol (IP) address,
a second list of entities of a second type, and for at least one second entity of the entities of the second type, a second reputation score, where the second reputation score indicates a relative threat of the at least one second entity in posing security threat, wherein the second type is a file hash, and
an association between
the at least one first entity and
the at least one second entity;
receiving a confidence value corresponding to a reliability of the association between
the at least one first entity and
the at least one second entity;
determining a second updated reputation score for the at least one second entity;
determining an updated reputation score for the at least one first entity based at least in part on the confidence value and based on determining the second updated reputation score of the at least one second entity;
updating, in the threat intelligence data, the first reputation score of the at least one first entity to the updated reputation score; and
training, based on the threat intelligence data as updated to include the updated reputation score, a machine learning model to identify possible threats based on detecting trends in associations among entities indicated in the threat intelligence data.

17. The non-transitory computer-readable medium of claim 16, further comprising code for:
receiving, via a user interface, a query for the at least one first entity;
retrieving, from the threat intelligence data, the updated reputation score for the at least one first entity; and
displaying, via the user interface, the updated reputation score in response to the query.

18. The non-transitory computer-readable medium of claim 16, further comprising code for receiving a request to update, in the threat intelligence data, a third reputation score of at least one third entity of the entities of the first type,
   wherein the code for determining determines the updated reputation score of the at least one first entity further based at least in part on updating, in the threat intelligence data, the third reputation score.

19. The non-transitory computer-readable medium of claim 16, wherein the code for determining the second updated reputation score comprises code for receiving a request to update the second reputation score of the at least one second entity to the second updated reputation score.

20. The non-transitory computer-readable medium of claim 16, further comprising code for:
   receiving updated threat intelligence data including a third updated reputation score for the at least one first entity; and
   updating the confidence value corresponding to the reliability of the association based at least in part on determining a difference between the updated reputation score and the third updated reputation score.

21. The non-transitory computer-readable medium of claim 16, wherein the first type comprises internet protocol (IP) addresses, and wherein the second type comprises file hashes.

* * * * *